July 21, 1953
E. B. COOK
2,645,869
APPARATUS FOR VIEWING OR PROJECTING
COLORED SLIDES OR TRANSPARENCIES
Filed May 29, 1948
2 Sheets-Sheet 1
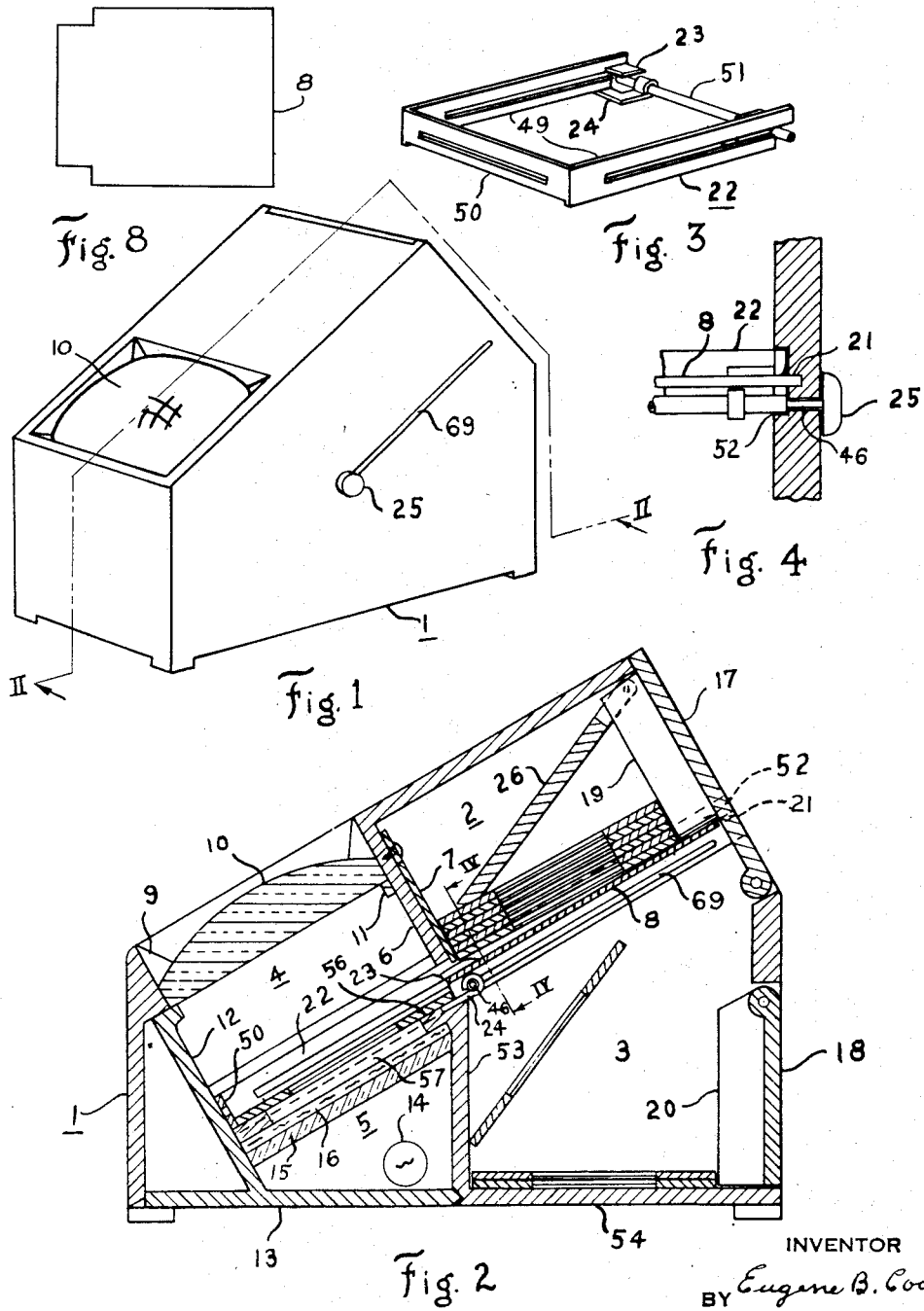
INVENTOR
BY *Eugene B. Cook*
ATTORNEY

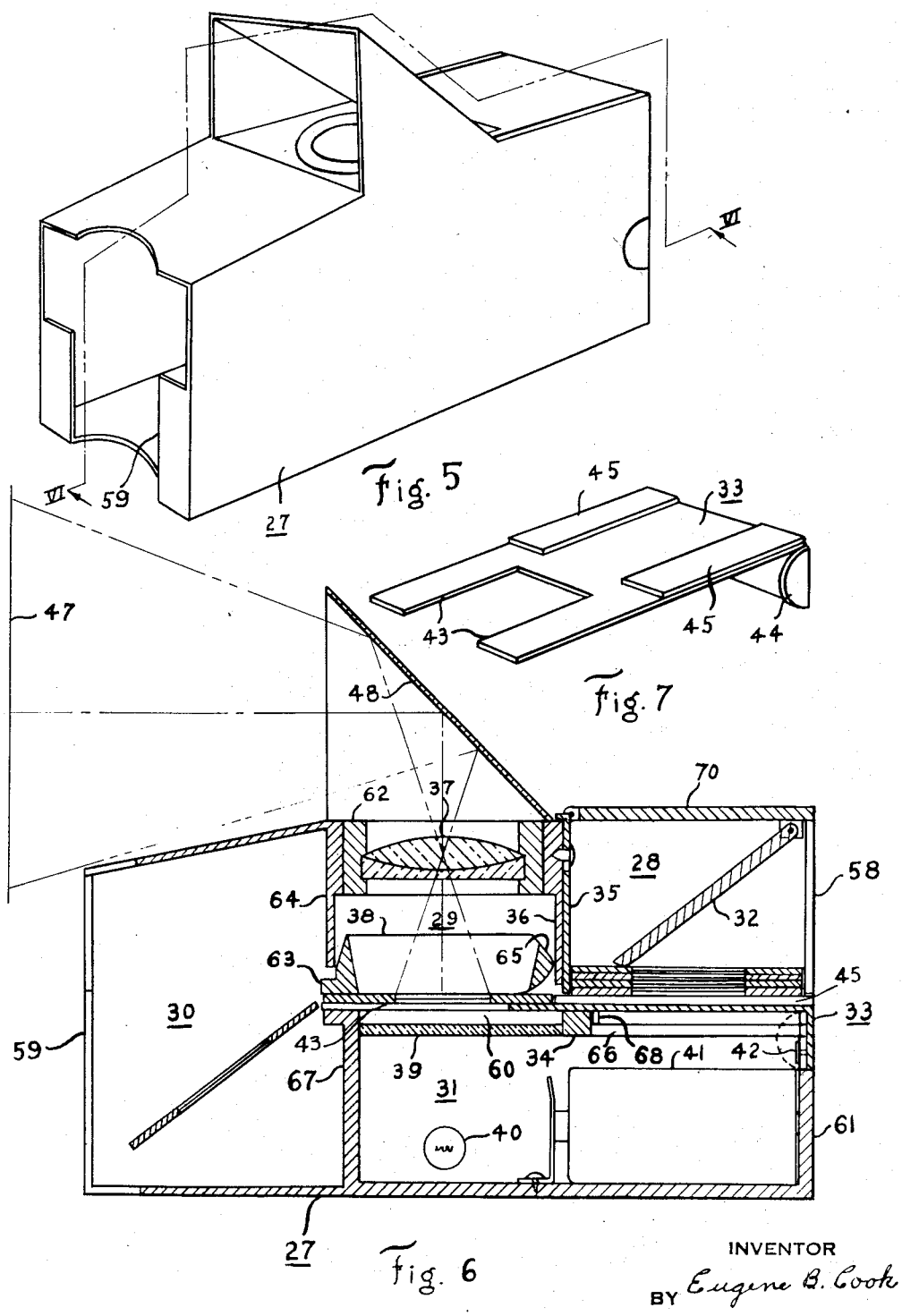

Patented July 21, 1953

2,645,869

UNITED STATES PATENT OFFICE 2,645,869

APPARATUS FOR VIEWING OR PROJECTING COLORED SLIDES OR TRANSPARENCIES

Eugene B. Cook, Milwaukee, Wis.

Application May 29, 1948, Serial No. 30,145

10 Claims. (Cl. 40—79)

This invention relates generally to apparatus for viewing or projecting colored slides or transparencies.

More particularly the present invention is directed toward and has as an object the provision of an appaartus of this type constructed and designed to minimize the handling and possible smearing of the film surfaces and also the time required to successively position slides in viewable or projectable relation with respect to a light source and a lens.

This invention also contemplates and has as an object the provision of a colored slide viewer or projector (hereinafter called viewer) incorporating improved features of construction and combinations designed to increase utility by affording a compact, durable and readily portable unit structure.

Another object of the present invention is to provide a viewer unit with parts constructed and combined for coaction in an improved manner to operate on a stack of slides positioned in the unit and successively position the slides in viewable or projectable relation to a light source and a lens and to restack the slides for removal therefrom as a group.

Still another object of this invention is to provide a viewer with a light source, a lens, a pair of magazine compartments, and a slide handling mechanism constructed and combined for coaction in an improved manner permitting a group of slides to be inserted as a unit in a magazine compartment and by a simple manipulation of an externally accessible part, cause the slides to be placed consecutively in viewing relation to the light source and lens and then disposed in the other magazine compartment for removal therefrom as a unit group.

A further object of the present invention is to provide an improved viewer unit including features of construction affording material advantages as to simplicity and cost of manufacture.

The construction and operation of apparatus embodying the invention will become readily apparent as the disclosure progresses and particularly points out additional objects and advantages considered of special importance. And accordingly the present invention may be considered as comprising the various features of construction and combinations hereinafter more fully set forth in the detailed description and appended claims, reference being had to the accompanying drawings, in which:

Figure 1 is a perspective view of one embodiment of the invention;

Figure 2 is a vertical section taken longitudinally through the viewer as indicated by line II—II of Figure 1;

Figure 3 is a perspective view of the slide actuator incorporated in the viewer shown in Figures 1 and 2;

Figure 4 is an enlarged partial sectional view of a side of the viewer taken on line IV—IV of Figure 2.

Figure 5 is a perspective view showing a second embodiment of the invention;

Figure 6 is a sectional view through the projector as indicated by line VI—VI of Figure 5;

Figure 7 is a perspective view of the slide actuator included in the projector shown in Figures 5 and 6; and Figure 8 is a plan view of the partition separating the magazine compartment from the underlying viewed slide receiving compartment.

The viewer shown in Figures 1 and 2 comprises a housing 1, preferably made of a plastic for ease in manufacture although other suitable materials could be used, internally divided into four compartments; namely an upper compartment 2 receiving the slides to be viewed, a lower compartment 3 for receiving viewed slides, a viewing compartment 4 and a light compartment 5. Compartment 2 is separated from compartment 4 by means of a partition 6 which includes an adjustable plate 7 and which extends downward toward an inclined metal partition 8 forming the floor of compartment 2 and the ceiling of compartment 3, partition 6 terminating in spaced edge opposed relation to the top surface of partition 8 thereby affording a slot-like opening through which a single slide may pass in moving from compartment 2 into compartment 3. Metal partition 8 is held in position by having opposite edge portions thereof disposed in parallel inclined slots 21 formed in the opposite side walls of housing 1. Compartment 4 is provided with locating projections 9 for holding a viewing lens 10 accurately positioned therein against a ledge 11 on the side adjacent partition 6 and against a similar ledge on opposed end wall 12. Wall 12 is integral with a removable bottom panel 13 which mounts a light bulb 14 connectable with a source of electricity through conventional connections (not shown). Compartment 5 is separated from compartment 3 by common vertical wall 53 integral with a base panel 54. Vertical wall 53 is integral with a downwardly inclined oblique wall portion 56 which abuts an intermediate portion of wall 12, the latter extending upward from base panel 13. Wall 56 is provided with an enlarged opening 57 for passage of light therethrough, and therefore may be considered as a viewing platform. Two opposite side walls of compartment 5 are provided with similar projections 15 which are spaced from and generally parallel with the adjacent underside surface of platform 56 to thereby form aligned slots receiving opposite edge portions of an opal glass light diffuser 16, the later being thus positioned between light source 14 and viewing compartment 4

Housing 1 has a door 17 forming the rear wall of upper compartment 2 and a door 18 forming the greater portion of the rear wall of lower compartment 3. Door 17 has one or more vertical inwardly extending ribs 19 adapted to engage the rear edges of slides disposed in compartment 2 and thereby hold the forward edges of the slides against adjustable plate 7 on partition 6. Upper opposed rear portions of the side walls of compartment 2 pivotally support a depending weight in the form of a platelike follower 26 adapted to engage the forward portion of the uppermost slide in a stack or pile facewise engaged slides disposed in compartment 2 and thereby urge the slides downward toward metal partition 8. The rear edge portion of follower 26 is recessed to afford the desired extent of downward movement thereof without interference from the inwardly extending ribs 19 on door 17. Door 18 has one or more similar ribs 20 for engaging the rear edges of viewed slides deposited in lower compartment 3 with the forward edges of these viewed slides engaging the wall between compartments 3 and 5.

Opposite side walls of housing 1 are provided with opposed inclined grooves 52 rectangular in cross-section and generally parallel to the top and bottom surfaces of partition 8. A slide actuator 22 (note Fig. 3) comprising similar bifurcated side walls 49, a slotted front wall 50, and a tubular rear part 51 connecting the rear ends of the lower bifurcation of the side walls, is positioned in housing 1 with its side walls 49 slidably disposed within and supported by the opposed generally rectangular slots 52. Rear end portions of bifurcated side walls 49 each carry a pair of vertically spaced plate-like tabs 23 and 24 projecting inward therefrom. If desired lower tab 24 may be additionally braced by a looped connection with tubular part 51. The slots formed by the bifurcated portions of the side walls 49 of actuator 22 and the slot in the front wall 50 thereof are adapted to receive opposite edge portions and the front portion, respectively, of metal partition 8. Opposite side walls of housing 1, preferably just below metal partition 8, are also provided with aligned inclined slots 69 therethrough generally parallel to the slide receiving opposite walls of rectangular slot 52, these slots receiving the opposite end portions of a rod or pin 46 which extends through rear tubular part 51 of actuator 22 and projects laterally beyond the opposite ends thereof a distance slightly exceeding the thickness of the side walls of housing 1 (note Fig. 4). Rod 46 is held in position in tubular part 51 by knobs 25 attached thereto and abutting the adjacent outer surface of housing 1. Referring particularly to Figure 2 it will be seen that actuator 22 is shown in its forward position, that is, in a position between compartments 4 and 5 with its front wall 50 abutting common end wall 12 and with the rear bifurcated portions of its side wall disposed above and below the forward edge portions of metal partition 8. In addition it should also be noted that tubular part 51 is disposed beneath metal partition 8, that plate-like tabs 24 are disposed in complementary recesses formed in top surfaces of viewing platform 56, and that tabs 23 are disposed in overlying abutting relation with respect to the top surface portions of metal partition 8.

In operation, door 17 is opened and the slides to be viewed are placed in compartment 2 with their forward edges disposed against the plate 7 on partition 6 and with plate-like weight 26 resting on the forward portion of the top slide. The door 17 is then closed and the metal slide actuator 22 is moved to the rear of the viewer (that is toward door 17) by grasping finger buttons 25 and pulling same toward the right as viewed in Figure 1. When slide actuator 22 reaches its rearmost position in compartment 2, projections 23 will have moved from a position beneath the forward end portion of the lowermost slide to a position beneath ribs 19 on the door 17, the bottom slide in the stack will drop down on partition 8 in front of the projections 23. When thus positioned, a forward movement of slide actuator 22 will move the bottom slide from compartment 2 to compartment 4, the slide being thus positioned between compartments 4 and 5 in overlying relation with respect to the opening 57 in partition wall 56 and with respect to diffusing glass 16 (note Figure 2). And in this connection it should be noted that rear portions of a slide in viewing position are resting on the top surfaces of tabs 24. Adjustable plate 7 on partition 6 will allow only one slide to be moved forward at a time and the next slide in the stack will be prevented from dropping onto partition 8 by the forward portion thereof engaging the top surface of projections 23. After viewing the slide in compartment 4, the slide actuator 22 is again moved from its forward position shown in Figure 2 to its rear position as previously described. This rearward movement of actuator 22 will carry the slide just viewed from compartment 4 into compartment 3 through engagement of front wall 50 with the forward edge of the slide, the rear portions of the slide resting on and being supported by tabs 24, as previously indicated. In its rearward travel the viewed slide will pass under the metal partition 8 and as the actuator 22 approaches its rearmost position the front edge of the viewed slide reaches the edge of viewing platform 56 and falls therefrom, the slide freely dropping in facewise relation to the bottom of compartment 3, as indicated in Figure 2. The actuator 22 is now in its rearward position allowing the next slide to be viewed to fall down in front of projections 23 preparatory to movement into the viewing compartment as previously described. In this connection, it should be noted that the rear edges of tabs 23 are preferably beveled to prevent scoring of the slides as the tabs move rearward thereunder.

Referring particularly to Figure 6, it is seen that in the second embodiment of the invention the projector comprises a housing 27 divided into four compartments of which 28 is a magazine for receiving slides to be viewed, 29 is a viewing compartment, 30 is a viewed slide receiving compartment, and 31 is a light compartment somewhat similar to the corresponding compartment of Figure 2.

Compartment 28 is closed at the top by a hinged cover 70 to the underside of which is hinged a swinging weight 32. The central portion of an upper rear wall section 58 of compartment 28 is cut away to provide an opening similar to that shown in front wall 59 for finger room when placing slides in the compartment. The bottom wall of this compartment is formed by a rectangular sheet metal actuator 33 (note Figure 7) supported in part by a transverse member 34, in part by the upper edge of lower rear wall section 61, and in part by opposed inwardly extending parallel rails 60 carried by opposite side walls of compartment 31, the top surfaces of these rails being substantially flush with the top surface of transverse member 34. A cutoff plate 35 is adjustably secured to a vertical partition wall 36, common to compartments 28 and 29, so as to allow only one slide at a time to be moved therebeneath from compartment 28 to compartment 29.

A projecting lens 37 is adjustably positioned at the top of viewing compartment 29, as by means of a slidable barrel mount or sleeve 62, so as to allow the projector to be focused on the screen 47, the image being reflected from a mirror 48. This compartment also includes a generally rectangular weight 38 conforming with the horizontal cross sectional configuration thereof, this weight being disposed therein below lens 37 for limited vertical movement as determined by the space between the lower edge of wall 64 and the top surface of a lateral projection or flange 63 on weight 38. Weight 38 has an upwardly flaring opening therethrough and is provided with a rounded nose-like edge portion 65 adjacent the common wall 36 between compartments 28 and 29. This weight is made of a material having a greater coefficient of friction against paper and glass than the slide actuator 33 has against paper and glass. For example, the weight material may be a rubber compound, although cloth and other materials are also suitable.

Compartment 31 contains an opal glass 39 having edge portions thereof disposed in grooves 66 formed in opposite side walls of compartment 31 and held in edge abutting relation to partition wall 67 by transverse member 34. A light 40 and battery 41 (provided with suitable connections not shown) are positioned in this compartment with the light 40 disposed in coaxial alinement with the central opening through weight 38 and with lens 37. A switch 42 is contacted by metal slide actuator 33 and closed when the slide actuator is positioned as shown in Figure 6, the electrical circuit for light 40 preferably including an additional switch (not shown) for opening this circuit when the projector is not in use.

Compartment 30 receives the viewed slides discharged from viewing compartment 29. The front wall 59 of housing 27, that is, the end wall of compartment 36, has a central opening therethrough and the central outer portion of the bottom wall 15 is cut away to facilitate removal of the viewed slides.

Metal slide actuator 33 is provided with a pair of spaced parallel longitudinal extensions or side portions 43 adapted to be disposed at the bottom of compartment 29 or at the bottom of compartment 28, depending on the position of the actuator. The rear end of the slide actuator is turned down and provided with edge tabs bent around to form finger pads 44 substantially parallel to the side walls of housing 1. Two metal runners 45 are secured to the topside edge portions of the rectangular body portion of slide actuator 33 in edge-opposed parallel relation with respect to each other.

In operation, a stack of slides is placed in the magazine 28 and the cover 31 is closed whereupon weight 32 then rests on the top slide of the stack. The metal slide actuator 33 is then moved from the position shown to a position halfway out of the viewer by grasping the finger pads 44 and pulling the slide 33 to the right as viewed in Figure 6. When slide actuator 33 reaches its outermost position, as determined by engagement of a projection 68 thereon with the inner surface of wall portion 61, the bottom slide of the stack will fall down in front of the runners 45. In this connection, it will be noted that the rear wall 61 and adjoining portions of the opposite side walls are suitably recessed to receive the depending rear tab portions 44 of actuator 33. The metal actuator is then pushed to the position shown in Figures 5 and 6, thus carrying the bottom slide into the viewing compartment 29 beneath the weight 38 as shown in Figure 6. The light circuit is closed by the slide actuator 33 contacting the switch 42 and the slide is viewed. In order to view the next picture in the stack in compartment 28, metal actuator 33 is again pulled out to the right as previously described. The picture slide in the viewing compartment 29 being held therein by its friction contact with the underside surface of weight 38. When actuator 33 reaches a position half way out of the housing 1, the viewed picture-slide in compartment 29 drops down in front of the arms 43 and is then supported by the top surface of rails 60 and by the top edge of wall 67. At the same time a new slide falls onto the top surface of actuator 33 in front of runners 45 and is thus positioned to be carried into compartment 29 as the actuator is moved into the housing. The cutoff plate 35 is adjusted so that only the bottom slide, that is, the slide disposed on actuator 33 in front of runner 45, is carried into compartment 29 when the actuator is moved to the left. As slide actuator 33 moves into compartment 29, the viewed slide therein is pushed into receiving compartment 30, where it falls to the bottom thereof and at the same time a new slide is carried from compartment 28 into compartment 29.

It should be readily understood that the projector shown in Figures 5 and 6 could be equipped with a lens system as shown in Figures 1 and 2, thus making a viewer of the projector and conversely, the viewer shown in Figures 1 and 2 could be equipped with a lens system similar to that shown in Figures 5 and 6 this making a projector of the viewer. Either of the two slide moving mechanisms could be used in any type of slide or picture viewing apparatus.

It is to be understood that various modifications of the invention may become apparent to those skilled in the art and that therefore it is not intended to limit the scope of the invention to the exact structure herein shown and described for purposes of illustration.

I claim:

1. An apparatus of the type described comprising wall structures forming an internally partitioned housing positionable to present a first compartment, a second compartment underlying said first compartment, an apertured partition separating said first compartment from said second compartment, a third compartment disposed alongside said first compartment, a second partition separating said third compartment from underlying relation to said third compartment, disposed alongside said second compartment in underlying relation to said third compartment, a common wall separating said fourth compartment from said second compartment, said second partition and common wall presenting adjacent edges disposed in spaced opposed relation, a thin partition member separating said fourth compartment from said third compartment and terminating in a free edge portion disposed intermediate said opposed edges of said second partition and common wall in spaced slot-forming relation thereto, a source of light in said second compartment, a lens forming a wall of said second compartment opposite said apertured partition, a slide carrier supported on an internal wall portion of said housing for reciprocation in generally parallel relation to said apertured partition and including parts disposed in adjacent over and underlying relation to the top and bottom surfaces, respectively, of said thin partition, said carrier being movable to slide receiving and discharging positions relative to said third and fourth compartments, respectively, and movable to a slide displaying position within said first compartment, and an externally accessible part operatively connected with said carrier for reciprocation of same.

2. An apparatus of the type described comprising wall structures forming an internally partitioned housing positionable to present a viewing compartment having a light transmitting partition forming a wall thereof and having a slide receiving support disposed adjacent said light transmitting partition for retaining a slide positioned thereon in facewise generally parallel relation to said light transmitting partition, and upper and lower magazine compartments disposed alongside said viewing compartment, said magazine compartments being in part defined by edge-opposed wall structures forming an elongated opening disposed immediately adjacent and mostly above the magazine end of said slide support, a relatively thin partition separating said magazine compartments and terminating in an end portion spacedly coacting with said edge-opposed wall structures to form therewith upper and lower slot-like openings dimensioned for the passage of a slide edgewise therethrough in facewise parallel relation to said slide support, said thin partition being positioned for facewise supporting engagement with the innermost one of a stack of facewise engaged slides placed in said upper compartment, and means for moving the innermost slide from a stack in said upper compartment edgewise through said upper opening and onto said support in said viewing compartment, and then through said lower opening and into the upper portion of said lower compartment in facewise freely falling relation to the bottom wall thereof.

3. An apparatus of the type described comprising wall structures forming an internally partitioned housing positionable to present a viewing compartment having a light transmitting partition forming a wall thereof and having a slide receiving support disposed adjacent said light transmitting partition for retaining a slide positioned thereon in facewise generally parallel relation to said light transmitting partition, and upper and lower magazine compartments disposed alongside said viewing compartment, said upper and lower compartments being in part defined by edge-opposed wall structures forming an elongated opening disposed immediately adjacent and mostly above the magazine end of said slide support, a relatively thin partition separating said magazine compartments and terminating in an end portion spacedly coacting with said edge-opposed wall structures to form therewith upper and lower slot-like openings dimensioned for the passage of a slide edgewise therethrough in facewise parallel relation to said slide support, said thin partition being positioned for facewise supporting engagement with the innermost one of a stack of facewise engaged slides placed in said upper compartment, and means for moving the innermost slide from a stack in said upper compartment edgewise through said upper opening and onto said support in said viewing compartment, and then through said lower opening and into the upper portion of said lower compartment in facewise freely falling relation to the bottom wall thereof, said means comprising a reciprocable slide carrier having an externally accessible actuator and including parts disposed in adjacent over and underlying relation with respect to the top and bottom surfaces of said thin partition.

4. An apparatus of the type described comprising wall structures forming an internally partitioned housing positionable to present a magazine compartment having an inner wall presenting an upper surface disposed for facewise engagement with the innermost one of a stack of facewise engaged slides placed in said compartment, a viewing compartment disposed adjacent a side portion of said magazine compartment, said magazine and viewing compartments being in part defined by a common partition wall presenting an innermost edge spaced from said inner wall sufficiently to form a first slot-like opening for the passage of a slide edgewise therethrough in facewise parallel relation to said inner wall, said viewing compartment having a slide receiving and retaining support disposed in generally parallel relation to said inner wall and being inwardly offset from the bottom surface thereof sufficiently to form a second slot-like opening for the passage of a slide edgewise therethrough in facewise parallel relation to said retaining wall, and a viewed slide receiving compartment disposed adjacent said viewing compartment and communicating therewith through said second slot-like opening, said receiving compartment having a slide receiving wall positioned for facewise engagement with the first of a series of slides successively entering said receiving compartment through said second opening, and means including said inner wall and an externally accessible part operatively coacting for successively moving slides from a stack in said magazine compartment through said first opening and into said viewing compartment and then through said second opening and into said receiving compartment.

5. An apparatus of the type described comprising wall structures forming an internally partitioned housing positionable to present a magazine compartment having an inner wall portion disposed for facewise engagement with the innermost one of a stack of facewise engaged slides placed in said magazine compartment, a viewing compartment disposed alongside said magazine compartment, said magazine and viewing compartments having a common partition wall presenting an innermost edge spaced from said inner wall sufficiently to form a first slot-like opening for the passage of a slide edgewise therethrough in facewise parallel relation to said inner wall portion, and a viewed slide receiving compartment adjoining the inner wall side of said magazine compartment, said receiving compartment being in part defined by a wall structure spaced inwardly from the viewing compartment end portion of said inner wall sufficiently to form a second slot-like opening for the passage of a slide edgewise therethrough in facewise parallel relation to said inner wall portion, said receiving compartment having a slide receiving wall which spacedly opposes said inner wall portion in offset relation to said second opening for facewise engagement with the first of a series of slides successively entering said receiving compartment through said second opening, and means including said inner wall portion and an externally accessible part for successively moving slides from a stack in said magazine compartment through said first opening and into said viewing compartment and then through said second opening and into said receiving compartment in facewise relation to said slide receiving wall thereof.

6. An apparatus of the type described comprising wall structures forming an internally partitioned housing positionable to present a viewing compartment having a light transmitting partition forming a wall thereof and having a slide receiving support disposed adjacent said light transmitting partition for retaining a slide thereon in facewise generally parallel relation to said light transmitting partition, and upper and lower magazine compartments disposed alongside said viewing compartment, said magazine compartments being in part defined by vertically spaced edge-opposed wall structures forming an elongated opening disposed immediately adjacent and mostly above the magazine end of said slide support and placing both said magazine compartments in communication with said viewing compartment, a relatively thin partition separating said magazine compartments and terminating in an end portion dividing said elongated opening into upper and lower slot-like openings dimensioned for the passage of a slide edgewise therethrough in facewise parallel relation to said slide support, said thin partition being positioned for facewise supporting engagement with the innermost one of a stack of facewise engaged slides placed in said upper compartment, and means for moving the innermost slide from a stack in said upper compartment edgewise through said upper opening and onto said support in said viewing compartment, and then through said lower opening and into the upper portion of said lower compartment in facewise relation to a bottom wall portion thereof disposed in slide receiving offset relation to said lower slot-like aperture.

7. An apparatus of the type described comprising wall structures forming an internally partitioned housing positionable to present a viewing compartment having a light transmitting partition forming a wall thereof and having a slide receiving and retaining support disposed adjacent said light transmitting partition for retaining a slide thereon in facewise generally parallel relation to said light transmitting partition, and upper and lower magazine compartments disposed alongside said viewing compartment, said magazine compartments being in part defined by vertically spaced edge-opposed wall structures forming an elongated opening disposed immediately adjacent and mostly above the magazine end of said slide support and placing both said magazine compartments in communication with said viewing compartment, a relatively thin partition separating said magazine compartments and terminating in an end portion dividing said elongated opening into upper and lower slot-like openings dimensioned for the passage of a slide edgewise therethrough in facewise parallel relation to said slide support, said thin partition being positioned for facewise supporting engagement with the innermost one of a stack of facewise engaged slides placed in said upper compartment, and means for moving the innermost slide from a stack in said upper compartment edgewise through said upper opening and onto said support in said viewing compartment, and then through said lower opening and into the upper portion of said lower compartment in facewise relation to a bottom wall portion thereof disposed in slide receiving offset relation to said lower slot-like aperture, said means comprising a reciprocable slide carrier having an externally accessible actuator and including parts disposed in adjacent overlying relation to the top surface of said thin partition.

8. An apparatus of the type described comprising wall structures forming an internally partitioned housing positionable to present upper and lower magazine compartments in part defined by edge-opposed wall structures forming an elongated opening therebetween, a relatively thin partition separating said magazine compartments and positioned to present a top surface disposed for facewise supporting engagement with the innermost one of a stack of slides placed in said upper compartment, said thin partition terminating in an end portion spacedly coacting with said edge opposed wall structures to form therewith upper and lower slot-like openings dimensioned for the passage of a slide edgewise therethrough in facewise parallel relation respectively to the top and bottom surfaces of said partition, a viewing compartment disposed alongside said magazine compartments and communicating with the bottom portion of said upper compartment and with the upper portion of said lower compartment through said upper and lower openings, respectively, a slide support disposed within said viewing compartment for receiving thereon a slide entering said viewing compartment through said upper opening, said support retaining a slide thereon in a position for movement therefrom through said lower opening, and means for moving the innermost slide from a stack in said upper compartment edgewise through said upper opening and onto said support in said viewing compartment, and then through said lower opening and into the upper portion of said lower compartment in facewise freely falling relation to the bottom wall thereof.

9. An apparatus of the type described comprising wall structures forming an internally partitioned housing positionable to present a first compartment, a second compartment disposed alongside said first compartment, a partition separating said second compartment from said first compartment, a third compartment underlying said second compartment, said third compartment being in part defined by a wall structure disposed in spaced opposed relation to an edge portion of said partition, a thin common wall separating said second compartment from said third compartment and terminating in a free end disposed in dual slot-forming relation relative to the space between the portion of said wall structure spacedly opposing said edge of said partition, a slide carrier supported on an internal wall portion of said housing for reciprocation in generally parallel relation to said thin common wall and including parts disposed in adjacent over and underlying relation respectively to the top and bottom surfaces thereof, said carrier being movable to slide receiving and discharging positions relative to said second and third compartments, respectively, and movable to a slide displaying position within said first compartment, and an externally accessible part operatively connected with said carrier for reciprocation of same.

10. An apparatus of the type described comprising wall structures forming an internally partitioned housing positionable to present a first compartment, a second compartment disposed alongside said first compartment, a partition separating said second compartment from said first compartment, a third compartment underlying said second compartment, said third compartment being in part defined by a wall structure disposed in spaced opposed relation to an edge portion of said partition, a thin common wall separating said second compartment from said third compartment and terminating in a free end disposed in dual slot-forming relation relative to the space between the portion of said wall structure spacedly opposing said edge of said partition, a slide carrier supported on an internal wall portion of said housing for reciprocation in generally parallel relation to said thin common wall and being movable to slide receiving and discharging positions relative to said second and third compartments, respectively, and movable to a slide displaying position within said first compartment, and an externally accessible part operatively connected with said carrier for reciprocation of same.

EUGENE B. COOK.

References Cited in the file of this patent

UNITED STATES PATENTS

| Number | Name | Date |
|---|---|---|
| 564,466 | Briggs et al. | July 21, 1896 |
| 1,002,078 | Paoli | Aug. 29, 1911 |
| 1,218,277 | Knauf | Mar. 6, 1917 |
| 1,336,585 | Roberts | Apr. 13, 1920 |
| 1,387,294 | Mosure | Aug. 9, 1921 |
| 1,543,852 | Hanscom | June 30, 1925 |
| 1,752,952 | Jelinek | Apr. 1, 1930 |
| 2,239,032 | Boch | Apr. 22, 1941 |
| 2,349,013 | Sparling | May 16, 1944 |
| 2,444,971 | Baker | July 13, 1948 |
| 2,513,102 | Parlin | June 27, 1950 |
| 2,516,793 | Mueller | July 25, 1950 |
| 2,533,441 | Estes | Dec. 12, 1950 |